US009694888B2

(12) United States Patent
Walpurgis

(10) Patent No.: US 9,694,888 B2
(45) Date of Patent: Jul. 4, 2017

(54) WATERCRAFT COMPRISING A REDUNDANT ENERGY ACCUMULATOR

(71) Applicant: CAYAGO GMBH, Kitzbühel (AT)

(72) Inventor: Hans Peter Walpurgis, Ellmau (AT)

(73) Assignee: Cayago GmbH (AT)

( * ) Notice: Subject to any disclaimer, the term of this patent is extended or adjusted under 35 U.S.C. 154(b) by 0 days.

(21) Appl. No.: 14/761,100

(22) PCT Filed: Dec. 23, 2013

(86) PCT No.: PCT/EP2013/077895
§ 371 (c)(1),
(2) Date: Jul. 15, 2015

(87) PCT Pub. No.: WO2014/111231
PCT Pub. Date: Jul. 24, 2014

(65) Prior Publication Data
US 2015/0367922 A1 Dec. 24, 2015

(30) Foreign Application Priority Data

Jan. 18, 2013 (DE) .................. 10 2013 100 543

(51) Int. Cl.
B63H 5/16 (2006.01)
B63C 11/46 (2006.01)
(Continued)

(52) U.S. Cl.
CPC ............... B63H 5/16 (2013.01); B63C 11/46 (2013.01); B63H 21/17 (2013.01);
(Continued)

(58) Field of Classification Search
CPC ... B63H 5/14; B63H 5/15; B63H 5/16; B63H 21/17; B63H 2021/17; B63C 11/46; B63C 2011/028; H01M 10/625; H01M 2/1083
(Continued)

(56) References Cited

U.S. PATENT DOCUMENTS 2,722,021 A 11/1955 Koegh-Dwyer
3,503,356 A 3/1970 Wilson
(Continued)

FOREIGN PATENT DOCUMENTS

DE 2445324 A1 1/1976
DE 3523758 A1 1/1987
(Continued)

OTHER PUBLICATIONS

International Search Report for PCT/EP2013/077895, ISA EP, Rijswijk, NL, mailed Mar. 31, 2014.
(Continued)

Primary Examiner — Daniel V Venne
(74) Attorney, Agent, or Firm — Lucian Wayne Beavers; Patterson Intellectual Property Law, PC

(57) ABSTRACT

A watercraft with a hull has a flow channel, or is associated with a flow channel, a motor-driven water-acceleration arrangement is associated with the flow channel and the motor is connected to an energy accumulator. In order to improve user convenience, two energy accumulators are integrated into the hull. The energy accumulators are arranged on both sides of the center longitudinal plane running in the longitudinal direction of the hull.

20 Claims, 4 Drawing Sheets

(51) Int. Cl.
  *B63H 21/17* (2006.01)
  *H01M 10/625* (2014.01)
  *H01M 10/6563* (2014.01)
  *H01M 2/10* (2006.01)
  *B63G 8/08* (2006.01)
  *H01M 10/643* (2014.01)

(52) U.S. Cl.
  CPC ....... *H01M 2/1083* (2013.01); *H01M 10/625* (2015.04); *H01M 10/6563* (2015.04); *B63G 8/08* (2013.01); *H01M 10/643* (2015.04); *H01M 2220/20* (2013.01)

(58) Field of Classification Search
  USPC ........... 114/6, 38, 49, 67, 68, 312, 313, 315, 114/56.1, 57; 440/6, 38, 49, 67, 68
  See application file for complete search history.

(56) References Cited

U.S. PATENT DOCUMENTS

| | | | |
|---|---|---|---|
| 3,650,234 | A | 3/1972 | Goudy |
| 4,826,465 | A | 5/1989 | Fleischmann |
| 5,158,034 | A | 10/1992 | Hsu |
| 5,396,860 | A | 3/1995 | Cheng |
| 5,634,423 | A | 6/1997 | Lashman |
| 5,878,687 | A * | 3/1999 | Grimmeisen .......... A63B 35/12 114/315 |
| 5,902,158 | A * | 5/1999 | Nakase ................ F02B 61/045 114/55.5 |
| 6,461,204 | B1 | 10/2002 | Takura et al. |
| 6,682,372 | B2 * | 1/2004 | Grimmeisen .......... B63B 35/73 114/315 |
| 6,912,967 | B1 | 7/2005 | Oats |
| 7,329,160 | B2 * | 2/2008 | Grimmeisen ......... B63B 35/731 114/315 |
| 7,963,814 | B2 * | 6/2011 | Grimmeisen .......... A63B 35/12 114/315 |
| 2001/0025594 | A1 | 10/2001 | Daniels |
| 2001/0042498 | A1 | 11/2001 | Burnham |
| 2004/0083940 | A1 | 5/2004 | Shelton et al. |
| 2004/0242088 | A1 | 12/2004 | McCann |
| 2007/0042498 | A1 | 2/2007 | Ebner |
| 2007/0283865 | A1 | 12/2007 | Railey |
| 2008/0168937 | A1 | 7/2008 | Ruan et al. |
| 2015/0353175 | A1 * | 12/2015 | Walpurgis .............. A63B 35/12 114/315 |

FOREIGN PATENT DOCUMENTS

| | | |
|---|---|---|
| DE | 102004049615 B4 | 4/2006 |
| FR | 2915172 A1 | 10/2008 |

OTHER PUBLICATIONS

Techsholdings: SEABOB. URL: https://www.youtube.com. Hochgeladen am Sep. 20, 2011, Position 0:05; Nov. 16, 2016].

German Office Action dated Nov. 17, 2016 from a corresponding application.

International Search Report in International Patent Application PCT/EP2013/077896 dated Mar. 24, 2014, 6 pp. {not prior art).

Office action of Oct. 14, 2016 in U.S. Appl. No. 14/761,112 (not prior art).

Office action of Jun. 28, 2016 in U.S. Appl. No. 14/761,112 (not prior art).

\* cited by examiner

WATERCRAFT COMPRISING A REDUNDANT ENERGY ACCUMULATOR

The invention relates to a watercraft having a hull which has a flow duct or which is assigned a flow duct, wherein the flow duct is assigned a water acceleration arrangement, in particular a propeller, and wherein the motor is connected to an energy store.

A watercraft of said type is known from DE 10 2004 049 615 B4. Said watercraft has a hull which forms a lying surface on which a user can at least partially lie in the region of his or her torso. The hull has two handles with control elements. A motor arrangement can be regulated in terms of power by way of said control elements. The motor arrangement drives a propeller. The propeller is arranged in a flow duct, wherein the propeller forms, in the region of the underside of the watercraft, an intake opening via which the water can be drawn out of the surroundings. The water is accelerated in the flow duct by means of the propeller and is discharged at the rear side, as in the case of a jet drive. The propeller is driven by an electric motor which is connected via supply lines to a battery as an energy store. The energy store is accommodated in a housing, and the housing is installed externally into a front-end recess of the hull. Such watercraft are in some cases used as diver propulsion vehicles with which divers perform dives over relatively long distances, in particular if the watercraft are used in the open sea, operational reliability and a high level of traveling convenience are of importance.

It is an object of the invention to provide a watercraft of the type mentioned in the introduction which is distinguished by a high level of user convenience.

Said object is achieved in that two energy stores are installed in the hull, wherein the energy stores are arranged on both sides of the central longitudinal plane running in the longitudinal direction of the hull.

Operational reliability is considerably increased through the use of two energy stores. In particular, in the event of failure of one energy store, for example owing to unpredicted operating states, a user can utilize the second energy store in order to thus safely return to his or her starting point. Redundancy is realized in this way. By virtue of the fact that the energy stores are arranged on both sides of the central longitudinal plane extending running in the direction of travel, a reduction in weight of the watercraft is realized. In this way, traveling convenience is considerably increased in particular because the mass of the energy store in the installation space of the hull is arranged in a more uniformly distributed manner. This increases in particular the positional and traveling stability.

In a preferred refinement of the invention, it is provided that the energy stores are arranged on both sides of the flow duct. A compact design is realized in this way. Furthermore, the torque induced by the rotating water acceleration arrangement can be at least partially stabilized, whereby traveling stability is further improved.

For the purposes of uniform weight distribution, the energy stores should particularly advantageously be arranged symmetrically with respect to the central longitudinal plane.

The energy stores, for example batteries, generate heat losses during operation. To prevent overheating of the batteries and thus premature failure, it may be provided in one variant of the invention that, in addition to the flow duct, a flooding chamber through which water can flow is arranged in the hull, and that the energy stores are arranged in the flooding chamber. In this case, the energy stores can dissipate at least some of their heat losses into the water flowing around them.

In one preferred refinement of the invention, it may be provided that at least one of the energy stores can be fixed in at least two installation positions in the hull, wherein the installation position are arranged offset with respect to one another in the direction of the longitudinal axis of the watercraft. In this way, the center of mass of the energy stores can be offset in the longitudinal direction of the watercraft. The trim of the watercraft can be adapted in this way.

A watercraft according to the invention may also be distinguished by the fact that the hull has an upper part and a lower part which can be exchangeably connected to said upper part, wherein receptacles for the energy stores are formed in the space enclosed by the upper part and the lower part, in which receptacles the energy stores are arranged in dismountable fashion. This construction firstly involves particularly little maintenance, as the energy stores are easily accessible and can be exchanged when required. It is merely necessary for the lower part to be dismounted from the upper part for this purpose. Furthermore, this design offers a simple construction principle as the energy stores can be positioned in the protected installation space between the upper and lower parts. In particular, the energy stores are protected against the action of external mechanical forces.

It has proven to be particularly advantageous if the center of mass of the energy stores is arranged offset in the direction of the rear end with respect to the central transverse plane which is perpendicular to the longitudinal axis. This construction is particularly advantageous if components of high mass, such as the drive motor and control components, are arranged in the region of the bow.

A watercraft according to the invention may be distinguished by the fact that a monitoring device which monitors one or more operating states of the energy stores is connected to control electronics, and that the control electronics have a switching device by means of which in each case one or both energy stores can be selectively connected to the motor. For example, the monitoring device may monitor the temperature of the energy store, and in the event of a maximum temperature being inadmissibly exceeded, said energy store can be deactivated by means of the switching device. Then, in the sense of redundant operation, the motor is fed by the second energy store alone. Such an arrangement considerably increases the operational reliability of the watercraft.

The object of the invention is also achieved by way of a construction kit for a watercraft having a hull which has a flow duct or which is assigned a flow duct, wherein the flow duct is assigned a motor-driven propeller, and wherein the motor is connected to an energy store. According to the invention, it is provided here that the hull has receptacles for two energy stores that can be installed in the hull, wherein the receptacles are designed such that energy stores of different structural size can be selectively fixed therein. By way of the two energy stores, redundant operation is again ensured. By virtue of the fact that the receptacles are designed for energy stores of different structural size and different power capacity, a variation in power can be implemented in a simple manner. Thus, with one hull construction, it is possible to generate different model variants, or an existing watercraft can be easily converted into a more powerful variant by exchanging the energy stores.

The invention will be discussed in more detail below on the basis of an exemplary embodiment illustrated in the drawings, in which.

Figure 1:
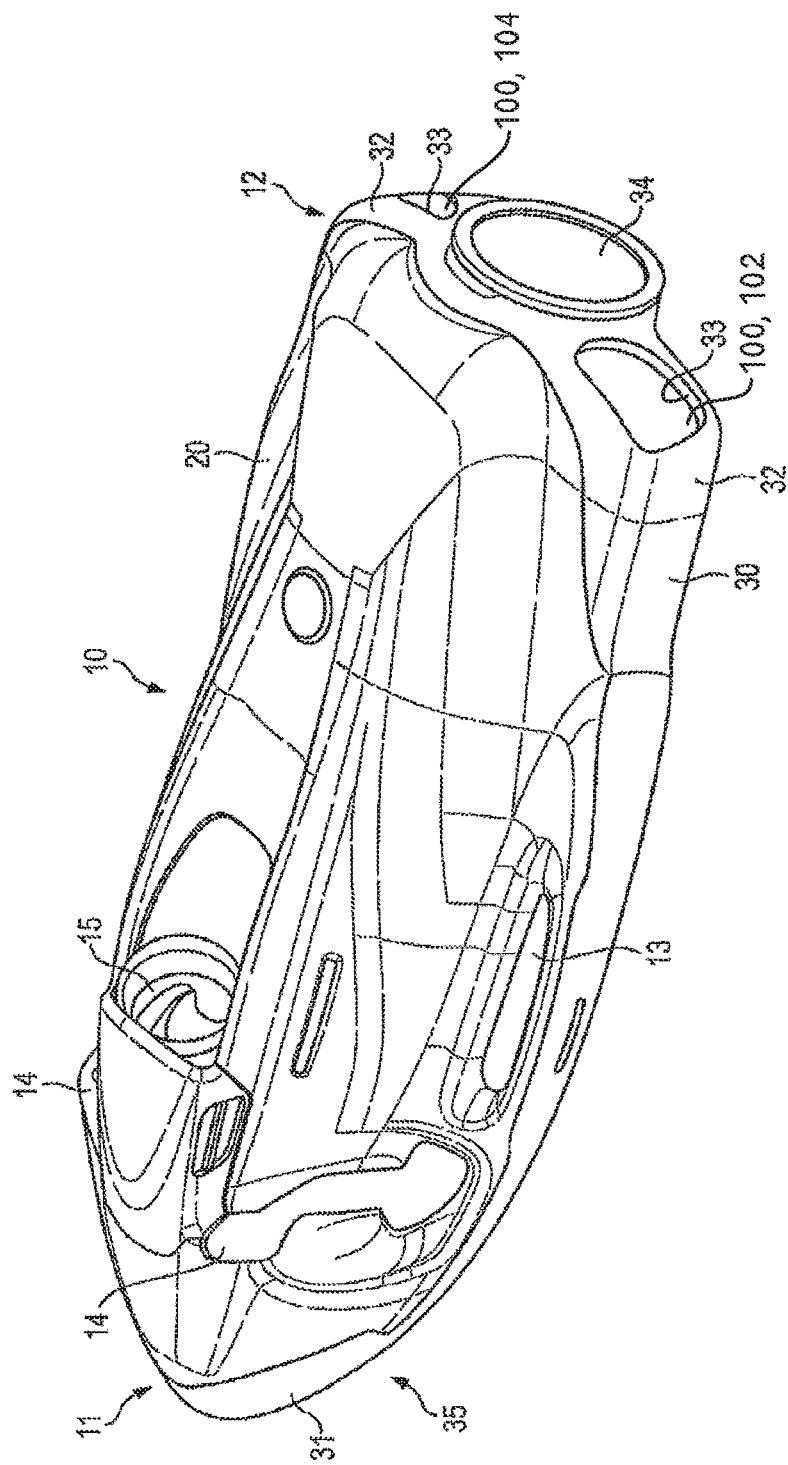
FIG. 1 shows a watercraft in a perspective side view from the rear.

FIG. 1 shows a watercraft which has a hull 10. In this case, the hull 10 is made up of an upper part 20 and a lower part 30. The upper part is equipped with two control handles 14 which are arranged on both sides of the hull 10. A user can grip said control handles 14 and can control the watercraft by way of operating elements attached to the control handles 14. In particular, it is possible here for the motor power of the watercraft to be varied. The user, gripping the control handles 14, lies by way of his or her torso regionally on the upper part 20 in the region behind a display 15.

Figure 2:
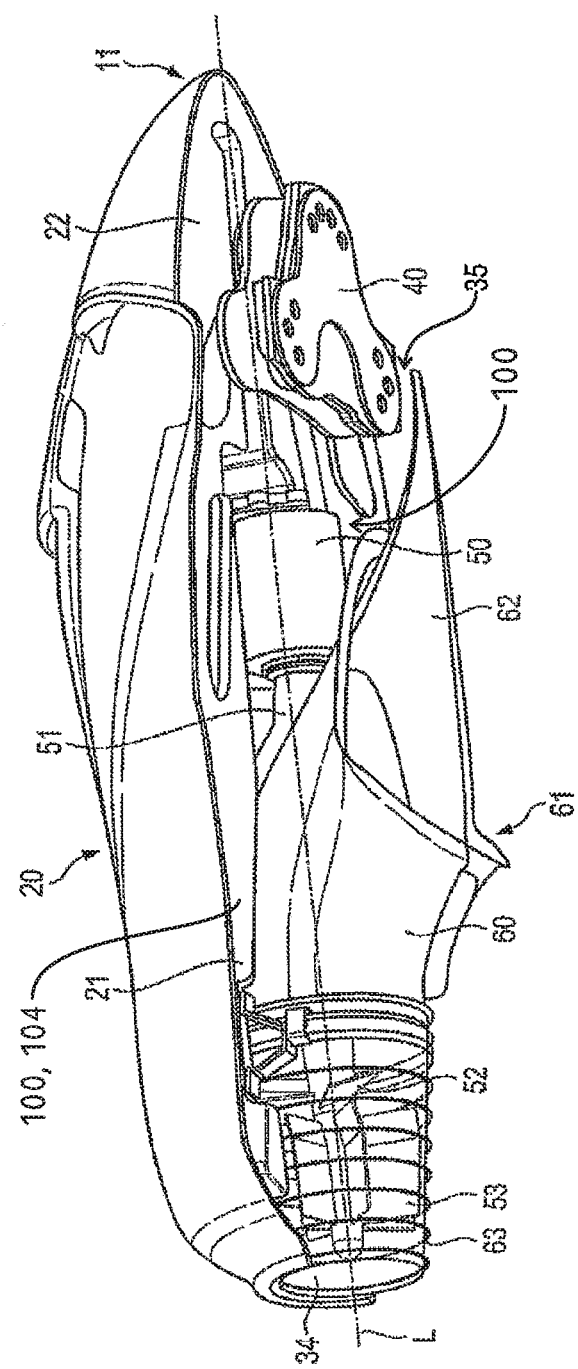
FIG. 2 shows the watercraft as per FIG. 1 in a perspective side view from below and with the lower part removed.

As can be seen from FIG. 2, the lower part 30 can be dismounted from the upper part 20. For this purpose, the lower part is screwed onto the upper part 20. FIG. 2 shows the watercraft with the lower part 30 removed. As can be seen from this illustration, a flooding chamber 100 is consequently formed between the upper part 20 and the lower part 30. Said flooding chamber 100 is delimited toward the top side by a base wall 22 of the upper part 20. Components of the watercraft can be mounted in stable fashion on said base wall 22.

As can be seen from FIG. 2, control electronics 40 are mounted in the region of the bow 11 of the watercraft. A drive unit in the form of an electric motor 50 is accommodated, in protected fashion in a housing, behind the control electronics 40 so as to be offset in the direction of the rear end 12. The output shaft of the motor 50 is led through a casing pipe 51 and bears a propeller 52 on its free end. The propeller 52 is arranged in a flow duct 60. In this case, the flow duct 60 is formed by a hollow body which forms an intake opening 61 in the region of the underside of the watercraft. Said intake opening 61 is stabilized by way of a guide element 62 arranged centrally in the intake opening 61. In addition to its mechanical protective function, the guide element 62 has the task of stabilizing the traveling operation. It acts similarly to the fin of a sailing boat. Furthermore, the guide element 62 also protects the flow duct 61 against mechanical load in the region of the intake opening when the watercraft runs aground or is set down on land. As has already been mentioned above, in the region between the upper part 20 and the lower part 30, a flooding chamber 100 is formed below the base wall 22, in which flooding chamber 100 the electrical components, specifically the control electronics 40, the motor 50 and the energy stores 70 (batteries), are accommodated. Said flooding chamber 100 is connected via water passage openings to the surroundings. In this case, the water passage openings are formed in the lower part 30. As can be seen from FIGS. 1 and 2, the water passage openings are in the form of water inlet openings 35 in the region of the bow 11 and in the form of water outlet openings 33 in the region of the rear end 12. When the watercraft is placed into the water, said flooding chamber 100 is flooded with water, which enters through the water passage openings. When the watercraft commences traveling operation, a flow is generated in the flooding chamber 100. Accordingly, water enters the flooding chamber 100 through the water inlet openings 35 in the region of the bow as generally shown in FIGS. 1 and 2. The water flows through the flooding chamber 100 and, in the process, washes around the electrical components that are held in the flooding chamber 100. In the process, the water absorbs the power losses from the electrical components and cools the latter. After flowing through the flooding chamber 100, the water exits the latter through the water outlet openings 33, which are arranged symmetrically on both sides of the jet outlet 34.

It can also be seen from FIG. 2 that the flow duct 60 extends through the flooding chamber 100 and divides the flooding chamber 100 into two subregions 102 and 104 of the flooding chamber 100. In each case one energy store (battery) is arranged in each of the subregions 102 and 104. Each of the subregions 102 and 104 also has one of the two water outlet openings 33. The electrical components are mounted on the base wall 22 of the upper part 20 by suspension means. Here, the suspension means is selected such that, at the regions via which heat losses are dissipated, the electrical components are held spaced apart from the base wall 22. Thus, the water in the flooding chamber 100 can flow effectively around the components here. It has been found that the arrangement of the flow duct 60 in the flooding chamber 100 results in a narrowing of the cross section of the flooding chamber 100. An increase of the flow speed in the narrowed region is achieved in this way. By means of this speed variation, it is possible for the water flow, and thus the cooling action, to be targetedly set in a manner dependent on the electrical component to be cooled. In the present exemplary embodiment, the energy stores 70 are arranged in the region of the narrowed cross sections in the subregions 102 and 104.

At its end averted from the intake opening 61 in the flow direction, the hollow body forms a flange region on which an in impeller housing 63 can be flange-mounted. The propeller 52 projects into the impeller housing 63. A flow stator 53 is arranged behind the propeller 52 in the flow direction. During operation, the propeller 52 draws water into the flow duct 16 through the intake opening 61, accelerates it and discharges it through the impeller housing 63 in the region of a jet outlet 34. In this case, the stator 53 has the task of straightening the rotating water movement, such that, for the purposes of improving efficiency, the flow emerges with the least possible swirl at the jet outlet.

As can be seen from FIG. 1, the upper part 20 has receptacles 21 in the region of the base wall 22. Said receptacles 21 are arranged on both sides of the flow duct 60.

Figure 3:
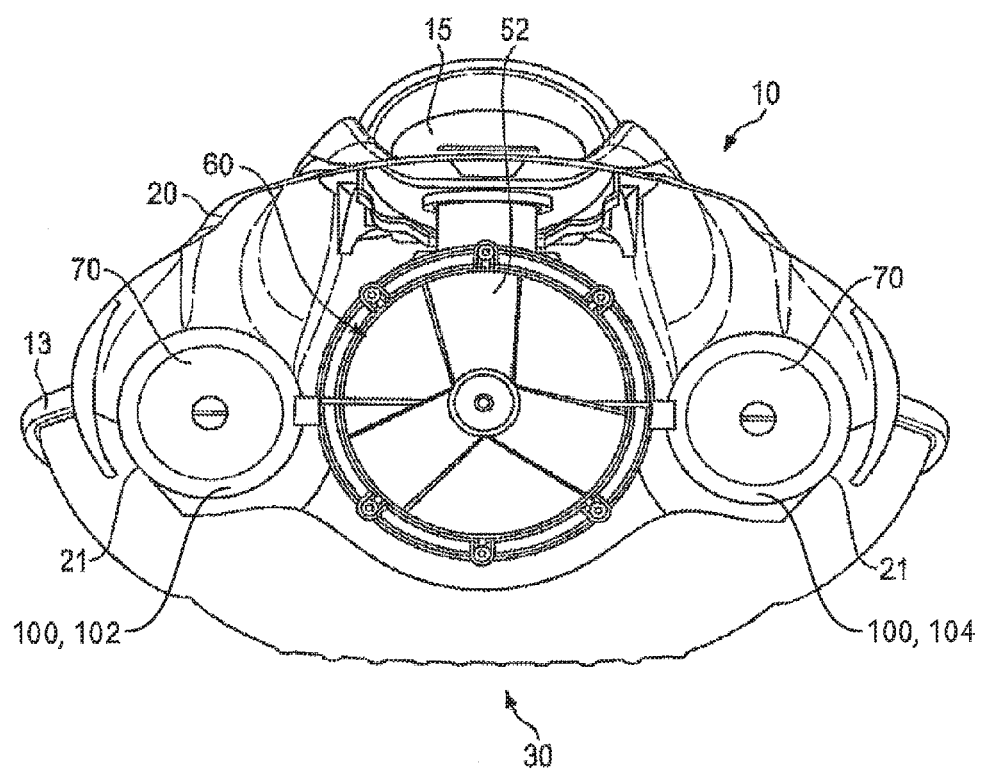
FIG. 3 shows a vertical section through the rear-end region of the watercraft as per the view in FIG. 2.

It can be seen from FIG. 3 that the receptacles 21 are arranged on both sides of the central longitudinal plane, running through the central longitudinal axis L (see FIG. 2), of the watercraft. The central longitudinal plane runs vertically in FIG. 3. The assignment of the two receptacles 21 to the central longitudinal plane is selected so as to yield a symmetrical design. Energy stores 70, which in the present case are in the form of electrical batteries, can be arranged in the receptacles 21. Owing to the symmetrical arrangement of the receptacles 21, the energy stores 70 are also arranged symmetrically with respect to the central longitudinal plane.

Figure 4:
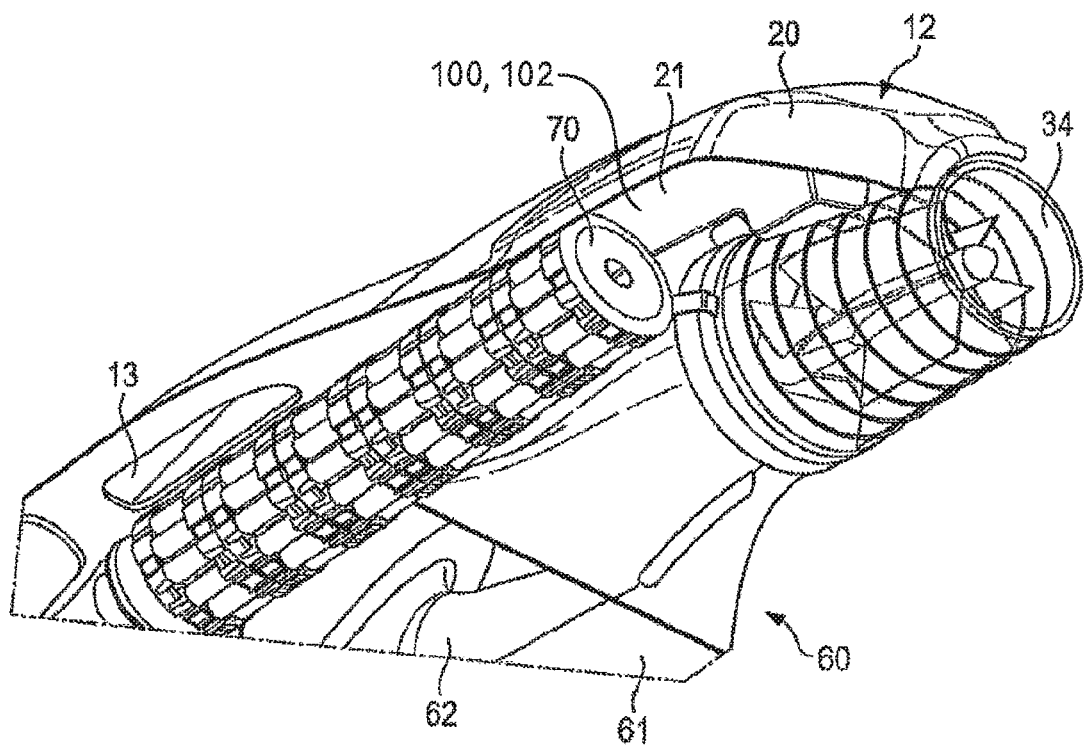
FIG. 4 shows the watercraft as per FIG. 2 in a detail view from below.

FIG. 4 shows the arrangement of the energy stores 70 in the receptacles 21. As shown in FIG. 4, the receptacle 21 is dimensioned so as to be longer in the longitudinal direction L of the watercraft than the extent of the energy store 70 in said direction. Consequently, the receptacle 21 provides space for the alternative installation of a different energy store 70 which is of correspondingly larger design and which consequently has a higher power output.

The invention claimed is:

1. A watercraft comprising:
a hull having a bow, a rear end, and a longitudinal axis extending between the bow and the rear end;
a flow duct arranged in the hull and formed by a hollow body extending between an intake opening and a jet outlet;
a propeller arranged within the flow duct;
a motor installed in the hull, the motor including an output shaft connected to the propeller;
a flooding chamber, separate from the flow duct, having a plurality of water passage openings in the hull; and
two energy stores installed in the flooding chamber and connected to the motor, the two energy stores disposed on both sides of the longitudinal axis, wherein the flooding chamber is configured to be flooded with water through the plurality of water passage openings to enable cooling of the two energy stores.

2. The watercraft as claimed in claim 1, wherein the two energy stores are arranged on both sides of the flow duct.

3. The watercraft as claimed in claim 1, wherein the two energy stores are evenly spaced away from the longitudinal axis.

4. The watercraft as claimed in claim 1, wherein the flow duct extends through the flooding chamber and separates the flooding chamber into two subregions of the flooding chamber, wherein one of the two energy stores is arranged in each of the two subregions of the flooding chamber.

5. The watercraft as claimed in claim 1, wherein the hull has an upper part and a lower part connected to said upper part, wherein receptacles for the two energy stores are formed in a space enclosed by the upper part and the lower part, and wherein the two energy stores are arranged in the receptacles.

6. The watercraft as claimed in claim 5, wherein the receptacles are dimensioned so as to be longer in a longitudinal direction than the energy stores.

7. The watercraft as claimed in claim 1, wherein the two energy stores have a center of mass and wherein the two energy stores are installed in the hull such that the center of mass of the two energy stores is closer to the rear end of the hull and further from the bow of the hull.

8. The watercraft as claimed in claim 1, wherein the motor is installed in the flooding chamber.

9. A watercraft comprising:
a hull having a bow, a rear end, and a longitudinal axis extending between the bow and the rear end;
a flow duct arranged in the hull and formed by a hollow body extending between an intake opening and an outlet;
a flooding chamber, separate from the flow duct, having a plurality of water passage openings in the hull wherein the flooding chamber is configured to be flooded with water through the plurality of water passage openings;
a propeller arranged within the flow duct;
a motor connected to the propeller; and
two batteries connected to the motor, the two batteries being installed in the flooding chamber on opposite sides of the flow duct so that the batteries may be cooled by water in the flooding chamber.

10. The watercraft of claim 9, wherein:
the two batteries are evenly spaced away from the longitudinal axis.

11. The watercraft of claim 9, wherein:
the hull has an upper part and a lower part connected to the upper part to form two receptacles on opposite sides of the flow duct, and the two batteries are located in the two receptacles.

12. The watercraft of claim 9, wherein:
the two batteries have a center of mass located closer to the rear end of the hull than to the bow of the hull.

13. The watercraft of claim 9, further comprising:
control electronics installed in the flooding chamber so that the control electronics may be cooled by water in the flooding chamber.

14. A watercraft comprising:
a hull having a bow, a rear end, and a longitudinal axis extending between the bow and the rear end;
a flow duct arranged in the hull and formed by a hollow body extending between an intake opening and an outlet;
a flooding chamber, separate from the flow duct, having a plurality of water passage openings in the hull wherein the flooding chamber is configured to be flooded with water through the plurality of water passage openings;
a propeller arranged within the flow duct;
a motor connected to the propeller; and
control electronics installed in the flooding chamber so that the control electronics may be cooled by water in the flooding chamber.

15. The watercraft of claim 14, wherein:
the hull has an upper part and a lower part connected to the upper part, the upper part including a base wall in part defining the flooding chamber, the control electronics being spaced from the base wall.

16. The watercraft of claim 14, wherein:
the control electronics are located forward of the motor.

17. The watercraft of claim 14, further comprising:
two batteries connected to the motor, the two batteries being installed in the flooding chamber on opposite sides of the flow duct so that the batteries may be cooled by water in the flooding chamber.

18. The watercraft of claim 17, wherein:
the two batteries are evenly spaced away from the longitudinal axis.

19. The watercraft of claim 17, wherein:
the hull has an upper part and a lower part connected to the upper part to form two receptacles on opposite sides of the flow duct, and the two batteries are located in the two receptacles.

20. The watercraft of claim 17, wherein:
the two batteries have a center of mass located closer to the rear end of the hull than to the bow of the hull.

* * * * *

UNITED STATES PATENT AND TRADEMARK OFFICE
CERTIFICATE OF CORRECTION

| | | |
|---|---|---|
| PATENT NO. | : 9,694,888 B2 | Page 1 of 1 |
| APPLICATION NO. | : 14/761100 | |
| DATED | : July 4, 2017 | |
| INVENTOR(S) | : Hans Peter Walpurgis | |

It is certified that error appears in the above-identified patent and that said Letters Patent is hereby corrected as shown below:

In the Specification

Column 1, Line 45: after "extending" delete "running".

Signed and Sealed this
Fifth Day of September, 2017

Joseph Matal
*Performing the Functions and Duties of the*
*Under Secretary of Commerce for Intellectual Property and*
*Director of the United States Patent and Trademark Office*